US009788060B2

(12) United States Patent
Chang et al.

(10) Patent No.: US 9,788,060 B2
(45) Date of Patent: Oct. 10, 2017

(54) METHODS AND SYSTEMS FOR AGGREGATION AND ORGANIZATION OF MULTIMEDIA DATA ACQUIRED FROM A PLURALITY OF SOURCES

(71) Applicant: THE TRUSTEES OF COLUMBIA UNIVERSITY IN THE CITY OF NEW YORK, New York, NY (US)

(72) Inventors: Shih-Fu Chang, New York, NY (US); Brendan Jou, Rego Park, NY (US); Hongzhi Li, New York, NY (US); Joseph G. Ellis, New York, NY (US); Daniel Morozoff-Abezgauz, New York, NY (US); Svebor Karaman, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 15/095,718

(22) Filed: Apr. 11, 2016

(65) Prior Publication Data
US 2016/0227282 A1 Aug. 4, 2016

Related U.S. Application Data

(63) Continuation-in-part of application No. PCT/US2014/060127, filed on Oct. 10, 2014.
(Continued)

(51) Int. Cl.
*G06F 17/30* (2006.01)
*H04N 21/462* (2011.01)
(Continued)

(52) U.S. Cl.
CPC ... *H04N 21/4622* (2013.01); *G06F 17/30784* (2013.01); *H04N 21/4332* (2013.01);
(Continued)

(58) Field of Classification Search
CPC ............... G06F 17/289; G06F 17/3002; G06F 17/30026
(Continued)

(56) References Cited

U.S. PATENT DOCUMENTS 5,703,655 A * 12/1997 Corey .................. G11B 27/105
348/468
6,356,902 B1 3/2002 Tan et al.
(Continued)

OTHER PUBLICATIONS

International Search Report mailed Jan. 13, 2015 in International Application No. PCT/US14/60127.

*Primary Examiner* — Dominic D Saltarelli
(74) *Attorney, Agent, or Firm* — Baker Botts L.L.P.

(57) ABSTRACT

A system for aggregation and organization of multimedia data acquired from a plurality of sources can include a data collection element, a multimedia segmentation element, a memory, an extraction element, and a user interface. The data collection element can be configured to receive multimedia data. The multimedia segmentation element can be coupled to the data collection element and can be configured to separate the multimedia data into a plurality of multimedia data segments. The memory can be configured to store hierarchical category information having a plurality of categories. The extraction element can be coupled to the multimedia segmentation element and the memory and can be configured to associate at least one of the plurality of categories with each of the plurality of multimedia data segments.

36 Claims, 15 Drawing Sheets

Related U.S. Application Data

(60) Provisional application No. 61/889,472, filed on Oct. 10, 2013.

(51) Int. Cl.
　　*H04N 21/433* 　　(2011.01)
　　*H04N 21/439* 　　(2011.01)
　　*H04N 21/44* 　　(2011.01)
　　*H04N 21/458* 　　(2011.01)
　　*H04N 21/482* 　　(2011.01)
　　*H04N 21/488* 　　(2011.01)
　　*H04N 21/81* 　　(2011.01)
　　*H04N 21/858* 　　(2011.01)

(52) U.S. Cl.
　　CPC ..... *H04N 21/4334* (2013.01); *H04N 21/4394* (2013.01); *H04N 21/44008* (2013.01); *H04N 21/458* (2013.01); *H04N 21/4821* (2013.01); *H04N 21/4826* (2013.01); *H04N 21/4884* (2013.01); *H04N 21/8126* (2013.01); *H04N 21/858* (2013.01)

(58) Field of Classification Search
　　USPC .......................................................... 725/115
　　See application file for complete search history.

(56) References Cited

U.S. PATENT DOCUMENTS

| | | | |
|---|---|---|---|
| 7,668,869 B2* | 2/2010 | Weinberger | G06F 17/30787 707/693 |
| 2013/0074109 A1* | 3/2013 | Skelton | H04H 20/00 725/14 |
| 2013/0166587 A1 | 6/2013 | Berry | |
| 2013/0262242 A1 | 10/2013 | Tateo et al. | |

* cited by examiner

METHODS AND SYSTEMS FOR AGGREGATION AND ORGANIZATION OF MULTIMEDIA DATA ACQUIRED FROM A PLURALITY OF SOURCES

CROSS-REFERENCE TO RELATED APPLICATIONS

The present application is a continuation-in-part of International Application Serial No. PCT/US2014/060127, filed Oct. 10, 2014 and published in English as WO2015/054627 on Apr. 16, 2015, which claims priority to U.S. Provisional Application Ser. No. 61/889,472, filed on Oct. 10, 2013, the contents of which are hereby incorporated by reference herein in their entireties and from each of which priority is claimed.

BACKGROUND

The disclosed subject matter relates to methods and systems for aggregation and organization of multimedia data acquired form a plurality of sources. For purpose of illustration and not limitation, multimedia data, including audiovisual presentations and publications of news stories, generally are not received and processed in isolation. Rather, such data can be driven by key entities that give the story context. For example, persons, places, times, and several surrounding topics can succinctly represent a news event, but are generally more useful if they can be both identified and linked together.

Among other factors, digital media and the Internet have led to a decline of viewership in broadcast television (TV) news and an increase in the use of Web-based platforms to find articles, short news clips, and blog posts. Among other reasons, the on-demand nature, flexibility for mobile consumption, and close-to-real time reporting can be more desirable compared to waiting for a newspaper print or a scheduled, lengthy video broadcast.

Nevertheless, the throughput of news content both broadcast and online has grown. One challenge is to address the resulting increase in multimedia data and develop high-throughput, content-based indexing and annotation solutions.

SUMMARY

The disclosed subject matter provides systems and methods for aggregation and organization of multimedia data. In an exemplary embodiment, a system for aggregation and organization of multimedia data acquired from a plurality of sources is provided. The system can include a data collection element, a multimedia segmentation element, a memory, an extraction element, and a user interface. The data collection element can be configured to receive multimedia data. The multimedia segmentation element can be coupled to the data collection element, and can be configured to separate the multimedia data into a plurality of multimedia data segments. The memory can be configured to store hierarchical category information having a plurality of categories. The extraction element can be coupled to the multimedia segmentation element and the memory and can be configured to associate at least one of the categories with each of the multimedia data segments. The user interface can be coupled to the extraction element and can be configured to provide a user with at least one of the multimedia data segments associated with a corresponding one of the categories in the hierarchical category information.

In some embodiments, the data collection element can include a recorder configured to record audiovisual data. The recorder can be configured to record at least one of analog video content and digital video content. The recorder can include a scheduling routine configured to query an electronic program guide feed and schedule a recording job for a news program. In some embodiments, the data collection element can include a web crawler. The multimedia segmentation element can include a closed caption reader configured to identify multimedia data boundaries. The multimedia segmentation element can include a dynamic time warping algorithm configured to align audiovisual data and closed caption data. The multimedia segmentation element can include a speech recognition element. The multimedia segmentation element can include a shot detection element configured to identify shot boundaries.

In particular embodiments, at least one of the categories can include a long-term event. At least one of the categories can include a breaking news event. In some embodiments, the extraction element can include a news video frame layout identifier. The extraction element can include a visual matching element. The extraction element can include a text-matching element. The text-matching element can include a term-frequency and inverse-document-frequency (TF-IDF) algorithm. The extraction element can include a video character recognition element configured to recognize text superimposed on video frames, also referred to as a keyword extraction element. The extraction element can include a speaker identification element. In particular embodiments the user interface can include a text entry box. The user interface can include a cross-domain bookmarklet feature. The user interface can include a filter feature. The user interface can be configured utilizing a physical simulation model to provide the user with at least one of the multimedia data segments based on an interaction between two or more categories associated with the provided multimedia data segments. The categories can include a topic, a named speaker, or other information extracted from the multimedia data segment.

In some embodiments, the extraction element can detect speaker names and times when a named speaker speaks during a multimedia data segment. In some embodiments, the extraction element can link at least one of a plurality of multimedia segments and a plurality of segment clusters to relevant trends in social media.

According to another exemplary embodiment, a method of aggregation and organization of multimedia data acquired from a plurality of sources is provided. The method can include receiving and separating the multimedia data into a plurality of multimedia data segments. The method can include storing hierarchical category information having a plurality of categories. The method can include associating at least one of the categories with each of the plurality of multimedia data segments. The method can include providing a user with at least one of the multimedia data segments associated with corresponding categories in the hierarchical category information.

In some embodiments, the acquiring multimedia data can include recording audiovisual data. Acquiring multimedia data can include crawling web sites to acquire the multimedia data. In some embodiments segmenting the multimedia data can include identifying multimedia data boundaries. Identifying multimedia data boundaries can include reading closed captions. Identifying multimedia data boundaries can include applying a time warping algorithm. Segmenting the multimedia data can include identifying shot boundaries.

In some embodiments, associating the categories with each of the multimedia data segments can include visually matching at least a portion of the multimedia data, and/or textually matching at least a portion of the multimedia data.

In some embodiments, category names and speaker names can be amended by extracting textual information from superimposed text on video image frames and associating speaker names with a plurality of faces having at least one of high visual similarity and speech similarity.

In some embodiments, at least one of a plurality of multimedia segments and a plurality of segment clusters can be linked to relevant trends in social media.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION

For purpose of illustration of the disclosed subject matter, and not limitation, an exemplary system of the disclosed subject matter is described with respect to integrating multimedia data from a plurality of news sources. The disclosed subject matter can be used to provide aggregation and organization of multimedia data acquired from a plurality of new sources, which can provide an immersive user experience in a fully-automatic setting. As embodied herein, the system can link and index content from heterogeneous news sources, including broadcast TV news, online articles, and can organize them into news events which can allow for accurate searching and exploration of key events within the news. By grouping together all of the content recorded from television and crawled online articles related to a particular news event, the system can provide coverage on an event with heterogeneous news sources.

Figure 1:
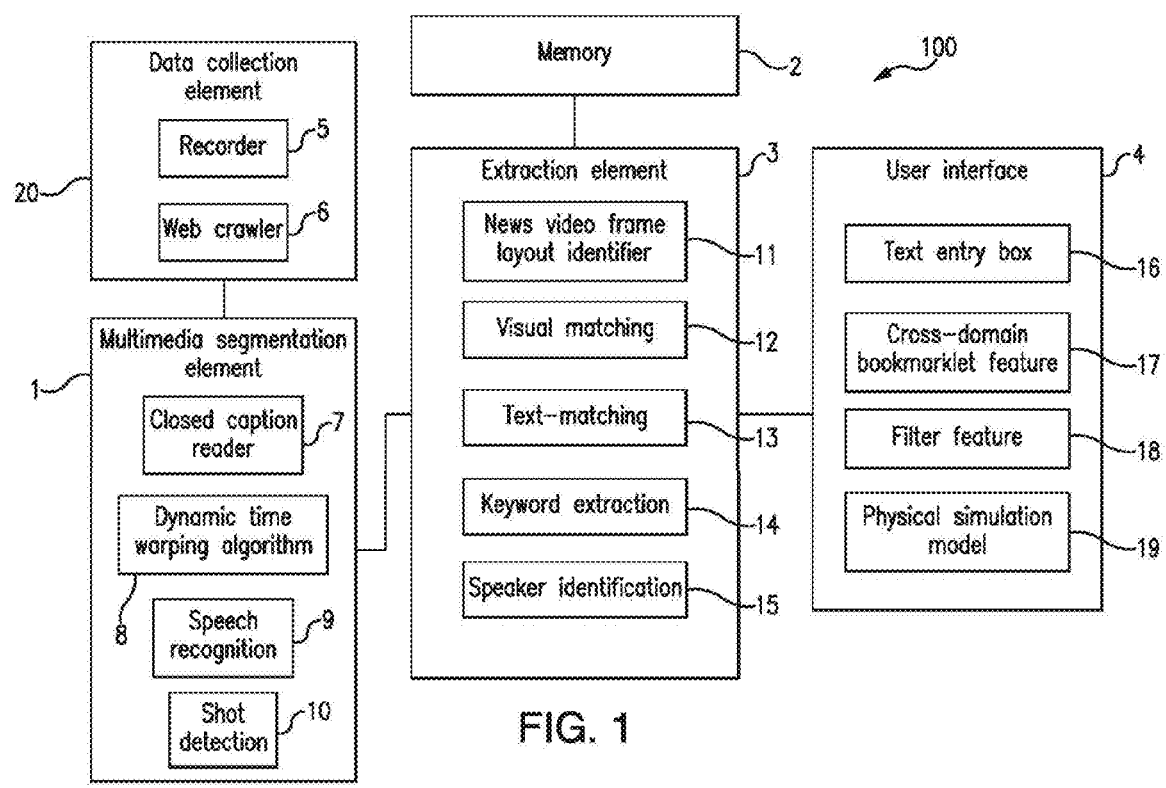
FIG. 1 is a diagram illustrating an exemplary system for aggregation and organization of multimedia data acquired form a plurality of sources, in accordance with the disclosed subject matter.

FIG. 1 shows, for the purpose of illustration and not limitation, a block diagram of an exemplary system 100 for aggregation and organization of multimedia data acquired from a plurality of sources. The system 100 can include a data collection element 20, a multimedia segmentation element 1, a memory 2, an extraction element 3, and a user interface 4.

The data collection element 20 can be configured to receive multimedia data. The data collection element 20 can include a recorder 5, for recording audiovisual data. The recorder 5 can be configured to record at least one of analog video content and digital video content or both. The recorder 5 can include a scheduling routine configured to query an electronic program guide feed and schedule a recording job for a news program. The data collection element 20 can include a web crawler 6.

Additionally, and as embodied herein, the recorder 5 can include 12 cable TV tuners equipped with on-chip encoding. The recorder 5 can record continuously from a mix of analog and digital channels as transport streams, generating about 700 hours per week and covering about 100 channels. A scheduling routine can query an electronic program guide feed every hour for an up-to-date listing of programs. The system 100 schedules a recording job for the next available TV tuner for each newly discovered news program. A variety of programs can be included which can be recorded every day. The daily programs can be some of the seminal English language news programs, such as "NBC Nightly News" and "Good Morning America".

Furthermore, and as embodied herein, the crawler 6 can query an online news source, for example Google News, which can be performed for a predetermined time period e.g., every five minutes, to identify new, unseen topics and obtain all articles indexed under that topic. In this manner, as embodied herein, a database of over 2,000 topics was collected over three years. The videos and articles that are downloaded can be linked together based on particular news events to which they correspond. In some embodiments, the crawler 6 can query online encyclopedia content, e.g., a Wikipedia current events page, for each predetermined time period, e.g., every five minutes. In this manner, information regarding news events all over the world can be provided via crowdsourcing.

The multimedia segmentation element 1 can be coupled to the data collection element 20 and can receive multimedia data from the data collection element. The multimedia segmentation element 1 can be configured to receive and separate the multimedia data into a plurality of multimedia data segments. In some embodiments the multimedia segmentation element 1 can include a closed caption reader 7. The closed caption reader 7 can be configured to identify multimedia data boundaries. The multimedia segmentation element 1 can include a dynamic time warping algorithm 8, which can be configured to align audiovisual data and closed caption data. The multimedia segmentation element 1 can also include a speech recognition element 8. In some embodiments, the multimedia segmentation element 1 can include a shot detection element 9 configured to identify shot boundaries.

In some embodiments, the closed caption reader 7, dynamic time warping algorithm 8, speech recognition 9, and shot detection 10 can be used to separate the multimedia data into a plurality of multimedia data segments. Recorded TV programs can be presented as a single contiguous video including a plurality of stories. In many such programs, closed captions (CC) can include ">>>" characters to demarcate the beginning of a new topic. Since such CC text is generally typed by a human operator, the CC text can lag the video by a period of time, e.g., about 12 seconds. The CC transcript can be accurate, but the time-offset can present a challenge, for example to implement any fine grained analysis or segmentation, if needed. Speech recognition can be accurate in time, but can be noisy. Speech recognition can present additional challenges in the news domain, at least in part because many of the words used in news broadcasts are locations, organizations, or first person names, which tend to be less well modeled by the language models used in speech recognition. A dynamic time warping algorithm 8, for example and embodied herein as a modified Levenshtein distance-based algorithm, can be used to align the audio generated transcript and closed caption transcript. In this manner, a temporally correct transcript for each video can be provided. Empirically, cutting using time-aligned ">>>" characters can result in about 2 seconds offset from the true boundary. Shot detection 10 can be used to determine shot boundaries to be likely story boundaries based on proximity with ">>>" symbols and shot lengths. The candidate boundary closest to the ">>>" position in the time-aligned CC can be chosen as the story boundary. In the case when CC story markers are unavailable, the system 100 can apply prior results on multimodal story segmentation, which demonstrated satisfactory performance with F-1 score up to 0.76.

Table 1 contains an example of the amount of content that can be collected per week according to the techniques of the disclosed subject matter.

TABLE I

| Programs recorded | 700 | Online articles | 72,000 |
|---|---|---|---|
| Hours of video | 700 | Google topics | 4,000 |
| Stories segmented | 7,000 | WikiPedia events | 100 |

Figure 2:
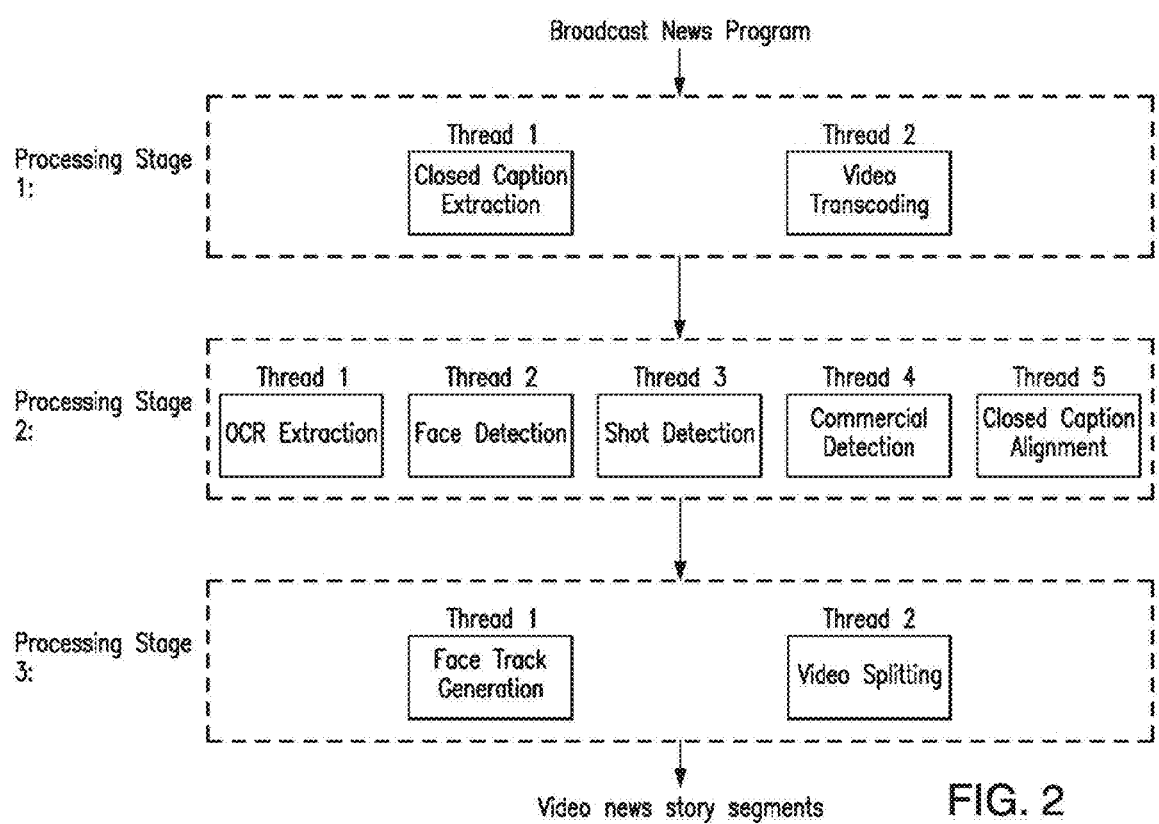
FIG. 2 is a diagram illustrating exemplary techniques for implementing for a video processing pipeline, in accordance with some embodiments of the disclosed subject matter.

A video processing pipeline for extracting information from videos can be parallelized in order to handle the large amount of raw video content collected by the multimedia segmentation element 1. The pipeline can be separated into 3 distinct sections, within each section information extraction algorithms can be executed in parallel and once all of the algorithms are completed the video processing pipeline can move on to the next stage of the pipeline. A process flow for the video processing pipeline is illustrated in FIG. 2. At the first processing stage, the data can be divided into two threads, e.g., 1) closed caption extraction; and 2) video transcoding. At the second processing stage, the data can be divided into five threads, e.g., 1) optical character recognition (OCR) extractions; 2) face detection; 3) shot detection; 4) commercial detection; and 5) closed caption alignment. At the third processing stage, the data can be divided into two tracks, e.g., 1) face track generation; and 2) video splitting.

Referring again to FIG. 1, the memory 2 can be configured to store hierarchical category information having a plurality of categories. In some embodiments at least one category can include long-term events. In some embodiments at least one category can include breaking news events. In some embodiments the category information can be related to one or more of the people involved in a news segment ("who"), the issue related to the news segment ("what"), the timing of the news segment ("when"), the location of the news segment ("where"), and the reason for the news segment ("why"). The memory 2, can be a storage system, for example a disk or storage medium, that can hold some or all of the collected videos, articles or other collected data. In some embodiments, the memory 2 can be coupled to one or more of the data collection element 20, multimedia segmentation element 1, extraction element 3, and user interface 4.

The extraction element 3 can be coupled to the multimedia segmentation element 1 and the memory 2. As such, the extraction element 3 can receive the multimedia data segments from the multimedia segmentation element 1. The extraction element 3 can be configured to associate at least one of the categories with each of the multimedia data segments. The extraction element can include a news video frame layout identifier 11. The extraction element can include a visual matching element 12. In some embodiments the extraction element can include a text-matching element 13. The text matching element 13 can include a text matching algorithm and can include a term-frequency and inverse-document-frequency (TF-IDF) algorithm. The extraction element can include a keyword extraction element 14 and in some embodiments the extraction element can include a speaker identification element 15. The extraction element 3 can discover news events, link videos and articles to these related events and extract the entities of interest from these automatically curated events.

Figure 3:
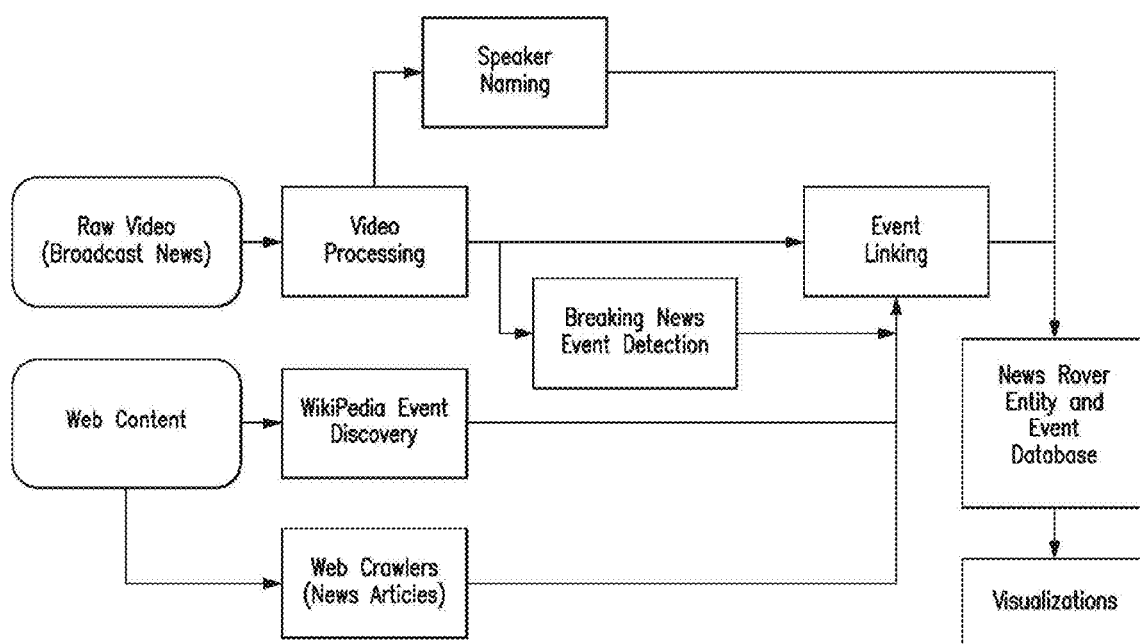
FIG. 3 is a diagram illustrating exemplary techniques for entity discovery and linking, in accordance with some embodiments of the disclosed subject matter.

FIG. 3 shows, for the purpose of illustration and not limitation, an exemplary flow chart for entity discovery and linking in accordance with the disclosed subject matter. Event discovery can be the process of identifying the news events that have happened in the real world from raw video and article news stream and then organize the related content. The extraction element 3, of the system 100, can have two distinct data mining strategies to discover events from this raw data, one using web content and one using raw video (broadcast news).

The web content strategy can utilize current events data which, for example and not limitation, can be obtained from the Wikipedia Current Events web portal. Event seeds can be created by extracting the text from each event description, and then scraping the text from any linked or related pages for a particular event. This can be performed, for example, every five minutes, to keep discovery close to real time. The seeds can provide a clear textual description of a real world event. Many of these event seeds can also contain images that the system can use when linking videos and articles to the respective seed.

The raw video strategy can detect real-world events from the raw video news stream. This unsupervised method provides the opportunity to discover more events with little to no latency. In order to discover the events from the raw news stream, visual content of the news can be analyzed. News agencies often show additional information on screen to identify the importance or timeliness of a news story. Examples of this are terms and visuals such as "Breaking News," "Happening Now," or "Developing Story," or other similar tags. Those tags appear on screen in the video stream and provide a handle to identify the news events from video. The system can use the story titles and extracted transcripts from each video as textual features to find videos related to the seed events that are aired in close temporal proximity to the event seed. If videos related to the "Breaking News" or the "Happening Now" event video seed are identified, the system can combine them together into an event cluster. For purpose of illustration, and as embodied herein, the system can detect the text on screen using Optical Character Recognition (OCR) technology. Traditional OCR technology can present a number of challenges to detect characters from video frames, including for example, the video frame being noisy and thus difficult to detect the textual area. Moreover, video frames can include a number of irrelevant characters on the screen, which can be unrelated to the desired news story. The system can be configured to find relevant information from the frames, e.g., head titles (such as "Breaking News" and the like) and program titles (for purpose of illustration, a description such as "JP Morgan: 80 million accounts hacked").

The news video frame layout identifier 11 can improve the OCR of the system. For each channel or news program, there can be a unique and relatively stable frame layout, which can describe the content of each area on the screen, such as the video footage area, head title area, or story title area. For each individual area, there can be a clear color and text font pattern. The OCR technology can be applied to the particular target area, and the OCR parameters could be adjusted automatically based on the target area property. Two strategies can be used to find news video frame layout: 1) a fully automatic method which considers the text region distribution over the entire program and 2) a semi-automatic method with an efficient tool help define the news video frame layout manually.

Techniques for event detection from raw video data can include sampling the video frames from a video program. The system can apply OCR techniques to those frames to find the text region on the screen and can generate a binary image for each frame with white on the text region and black color on the rest of the frame. The system can combine all the resulting binary images and obtain an average gray image. A threshold can be utilized to obtain one or more high response regions as candidate text regions for this particular program. For each of the candidate regions, the system can examine all the text bounding boxes overlapping the candidate regions. The system can remove such bounding boxes, for example and as embodied herein, if the screen content of that text bounding box is not stable by determining a pixel difference between contiguous frames. The system can also remove the bounding boxes overlapping another larger bounding box. In this manner, the system can obtain a set of bounding boxes for each video program, to which OCR techniques can be applied to obtain the desired text content.

Figure 4:
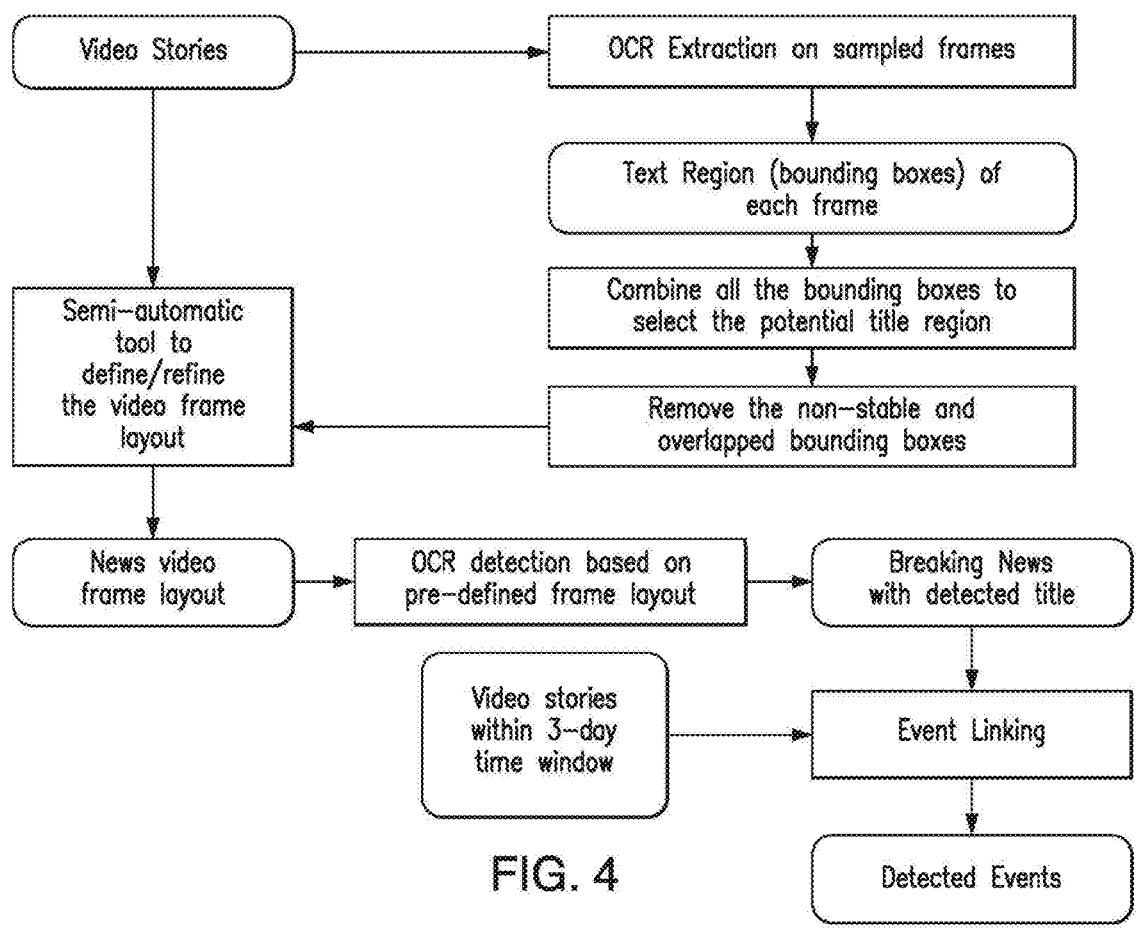
FIG. 4 is a diagram illustrating exemplary techniques for graphic depiction of the breaking news event discovery from video stream, in accordance with some embodiments of the disclosed subject matter.

The fully automatically method can be used to detect the news video frame layout. The results can be improved using a semi-automatic detection methodology. For purpose of illustration, techniques to examine each bounding box detected by the techniques above can be performed, and a user can either add the new bounding box containing the text title or reject the candidate bounding boxes discovered incorrectly. Additionally, as embodied herein, the OCR parameters used to detect the text from a bounding box can be adjusted, which can allow for more accurate optical character recognition. A graphic depiction of the breaking news event discovery from video stream is illustrated in FIG. 4.

As new news articles and videos are identified, they can be linked with previously identified events. The system can apply near-duplicate detection in order to visually match 12 related stories to events and text match 13, for example, including term-frequency and inverse-document-frequency (TF-IDF) weighting, to calculate the textual similarity. Once both scores are derived it then combines via linear combination of the scores to create a final content-event score. News articles and videos can be linked to the most relevant event based on their final content-event score.

Figure 5:
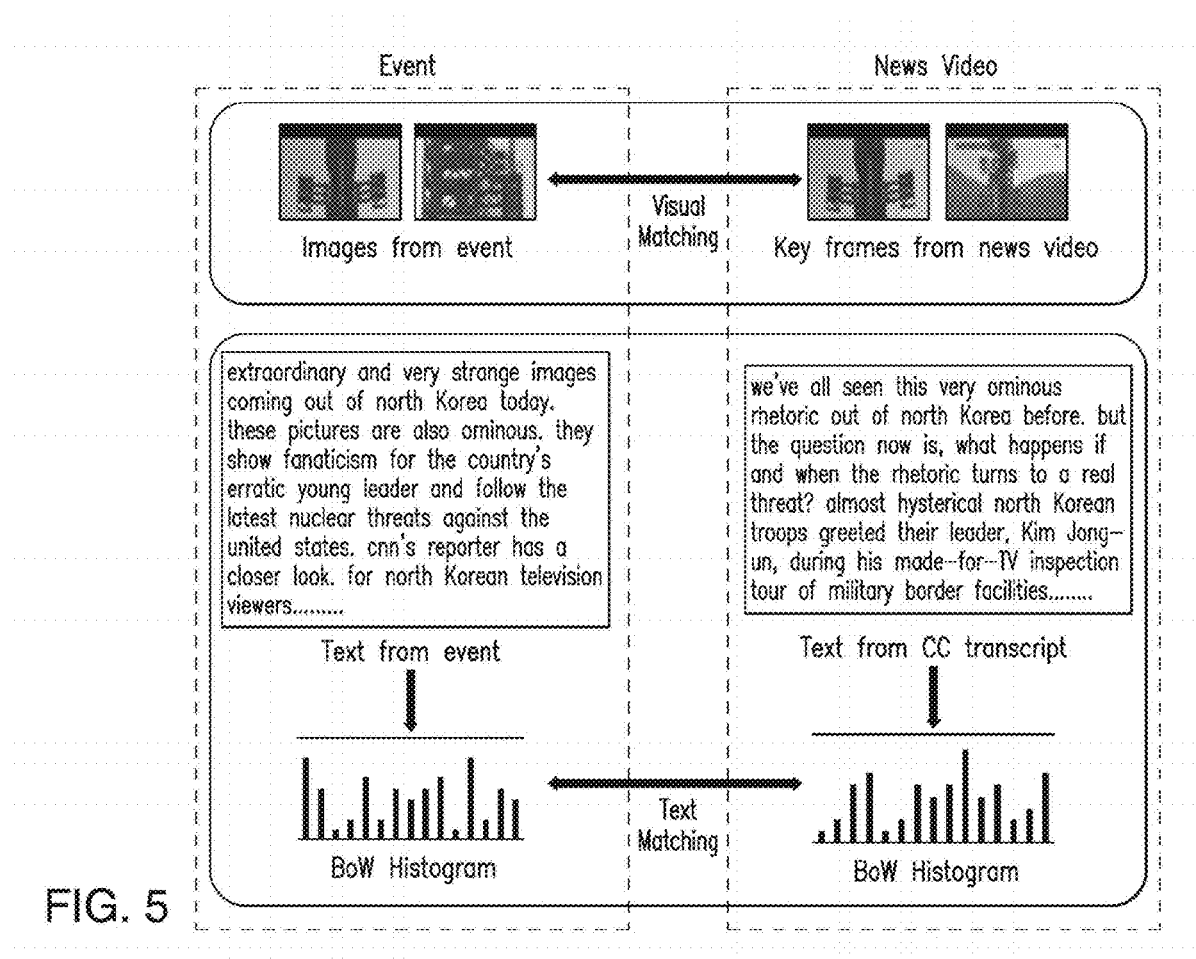
FIG. 5 is a diagram illustrating exemplary techniques for graphical depiction of the event linking, in accordance with some embodiments of the disclosed subject matter.

For each "breaking news" event detected from video stream, the system extracted key frames from all the videos linked to it as the visual representation. Additionally, the system combines all the story titles detected from the videos linked to the event as the text feature. For purpose of illustration, and not limitation, for each event generated by an event seed, e.g., which can be obtained from Wikipedia as described herein, the system can collect all the images in the articles linked to it as the visual representation and all the article title and description of the articles linked to it as the text feature. Thus, for each event, the system can have a collection of images and text as the event representation, which can be used in event linking framework. A graphical depiction of the event linking is illustrated in FIG. 5, for the purpose of illustration and not limitation.

The CC text in TV news is a rich source of annotation on the video, containing explicit mentions of persons, locations and organizations associated with a story. CC can be caseless, and thus the system can perform named entity recognition using a model trained on sentence examples where every letter was capitalized. Since the CC was previously aligned with the speech, time stamps were also assigned to detected named entities, specifying exactly when they were mentioned in the video. Since named entities extracted from CC are not always accurate, databases, such as DBpedia and Wikipedia, can be used to correct and normalize the entities. In this manner, typographic errors and aliases can be resolved and profile pictures can be extracted. In some embodiments, about five names per story segment can be extracted.

A keyword extraction algorithm 14 can extract the important concepts in each topic. Given the time occurrence of named entities, points in the video where a key concept and person is mentioned in CC within a 15-second time window of each other can be identified. This co-occurrence mining of relations between entities-to-entities and entities-to-key-concepts can allow exploration of how so-called "major players" shape the news.

The speaker identification element 15 can include two multimodal algorithms for extracting quotes and video segments associated with each of these named persons (i.e., extracting "who said what") to provide additional linking modes and measure an entity's influence on an event. The first technique ("graph-based speaker naming") is configured to name every speaker that appears on screen, and can exhibit good precision and recall statistics. The second technique ("audio and OCR based speaker naming") is not configured to name every face that appears on the screen, and as such can exhibit lower recall, but can have a high precision for the speakers it does attempt to name.

The graph-based speaker naming algorithm can represent the speaking person based on their visual and audio appearances, and can fuse the modalities using machine learning techniques. First, to extract the visual information from the video the system can perform face detection on the news stories using OpenCV's Haar-like cascade and then can extract SIFT features from detected landmark points within each detected face. The system can generate face tracks by exploiting temporal and spatial continuity within the detected faces. The system can determine the similarity between face tracks using a Gaussian Kernel distance between every pair of faces in the tracks, and then average the distance in the top face pairs. The system can also perform text detection on sampled frames from the stories to extract on-screen person names. These names from OCR, along with those from CC, can be combined and normalized to form the set of candidate name labels during the prediction stage.

The basic visual unit can be the face track; the basic audio unit can be a speech segment. Speech segments denote contiguous speech by one or more persons without extended silence. The system can extract segments by applying an audio speech segmentation tool. On average, detected speech segments can be 2.3 seconds long. To measure the similarity between segments, the system can extract MFCCs from each audio segment and model each as a multivariate Gaussian. The distance between speech segments can be measured by the symmetric Kullback-Leibler (KL) divergence over the multivariate Gaussian distributions, and then a Gaussian kernel over the KL-distances can be normalized by the standard deviation of all the distances in a story segment.

To link the audio and visual features, the system can implement a visual speaker detection algorithm. This knowledge of who is visually speaking can allow the system to disambiguate from whom the speech is originating, i.e., when there is more than one person on screen. Instead of pure visual speaker detection, the system can take a hybrid multimodal approach to detecting visual speakers. Using the facial landmarks, the system can affine-align the face, determine the mouth region and perform template matching to detect whether the face is speaking. Repeating this over the entire face track, the system can get a series of best template matches which correspond to the smallest sum of square differences for "inter-frames" or frame pairs. The system can set two thresholds to predict if the "inter-frame" is non-speaking, reject and speaking. The system can use majority voting within face tracks that overlap speech segments to predict if the face is visually speaking.

Given the multimodal speaker identity cues, problems can be positioned in a transductive learning setting and the system can use label inference over a heterogeneous graph with weak labels, which correspond to the names automatically extracted from the news video. The system can create a visual subgraph including face tracks and an audio subgraph including speech segments, both constructed using b-matching graph construction techniques. Cross-modal edges can be formed between vertices of the two subgraphs if a face track temporally overlaps a speech segment and is detected as speaking via the multimodal speaker detection algorithm.

The system can apply the extracted names from CC and OCR as weak labels on the constructed graph. A number of approaches to weak label assignment can be used. For example, if a face track temporally overlaps with an occurrence of an OCR name on-screen the system can assign the name to that face node. Additionally or alternatively, if a new face track appears on screen up to 10 seconds after a CC name appears in the transcript, the system can assign the CC name to this face node. These so-called weak labels can be propagated on the graph using local and global consistency, enforcing smoothness using the normalized Laplacian and softly constraining the solution to the labels since they are considered weak. The system can set the highest scoring label and its corresponding name as the prediction for each node in the graph. Given the predicted names for speakers, getting the "what," or quote, related to them can be retrieved base on their associated speech segments and extracting the portion of closed captions that is time-locked with the speech.

Figure 6:
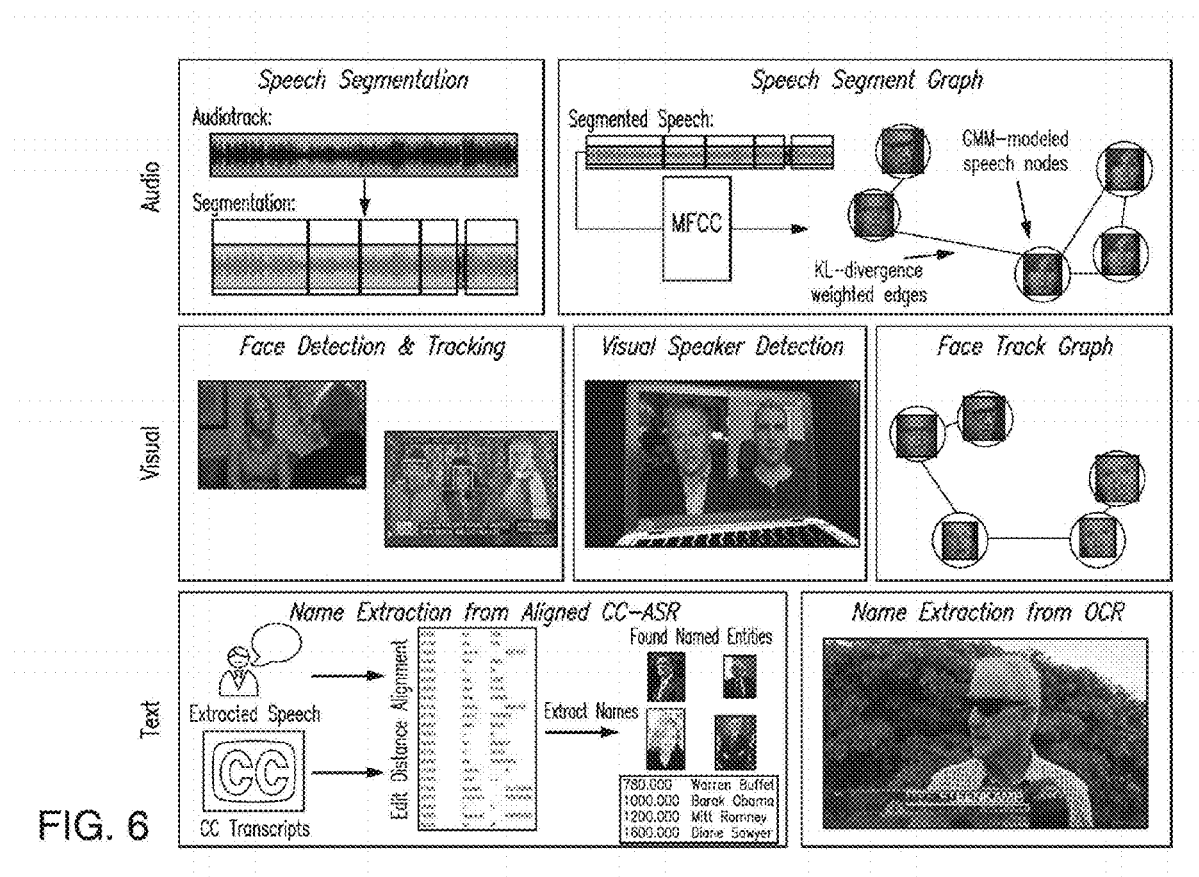
FIG. 6 is a diagram illustrating exemplary techniques for graph-based speaker naming, in accordance with some embodiments of the disclosed subject matter.

As an example, annotations were collected using Amazon's Mechanical Turk over 225 detected face tracks from NBC Nightly News and News 4 New York over an average of 5 to 7 unique names per story. Face tracks were limited to a subset of mostly frontal tracks by performing a second pass of face detection using a higher threshold. When considering all identities, including those who never spoke, the system correctly labeled 105 face tracks for a total accuracy of 0.475, using the extracted CC and OCR names as weak labels. This represents a significant improvement over simply using CC or OCR names as weak labels alone, which give accuracies of 0.284 and 0.40, respectively. Additionally, if speakers are limited to speaking non-anchors appearing on-screen, the system can achieve an accuracy of 0.619. A detailed diagram of the technologies utilized in this algorithm is shown in FIG. 6, for purpose of illustration and not limitation.

Figure 7:
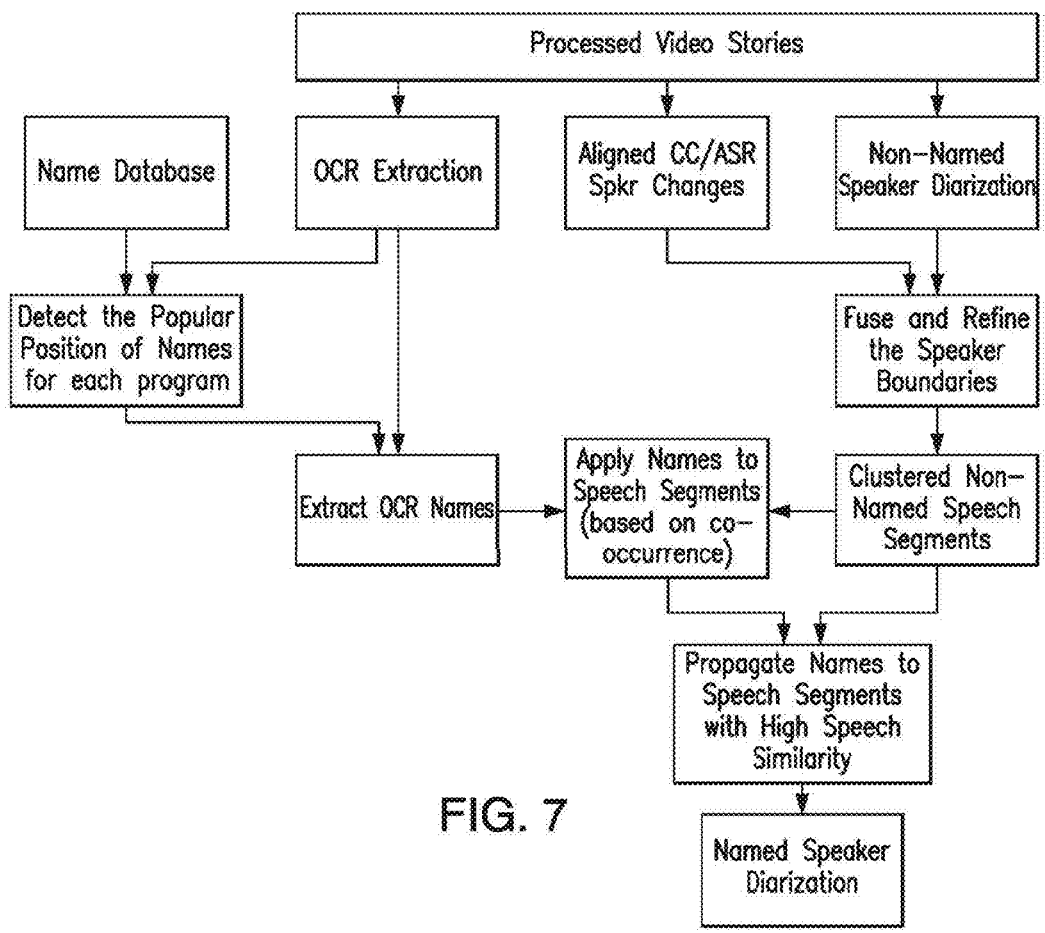
FIG. 7 is a diagram illustrating exemplary techniques for audio and OCR-based speaker naming, in accordance with some embodiments of the disclosed subject matter.
Figure 8:
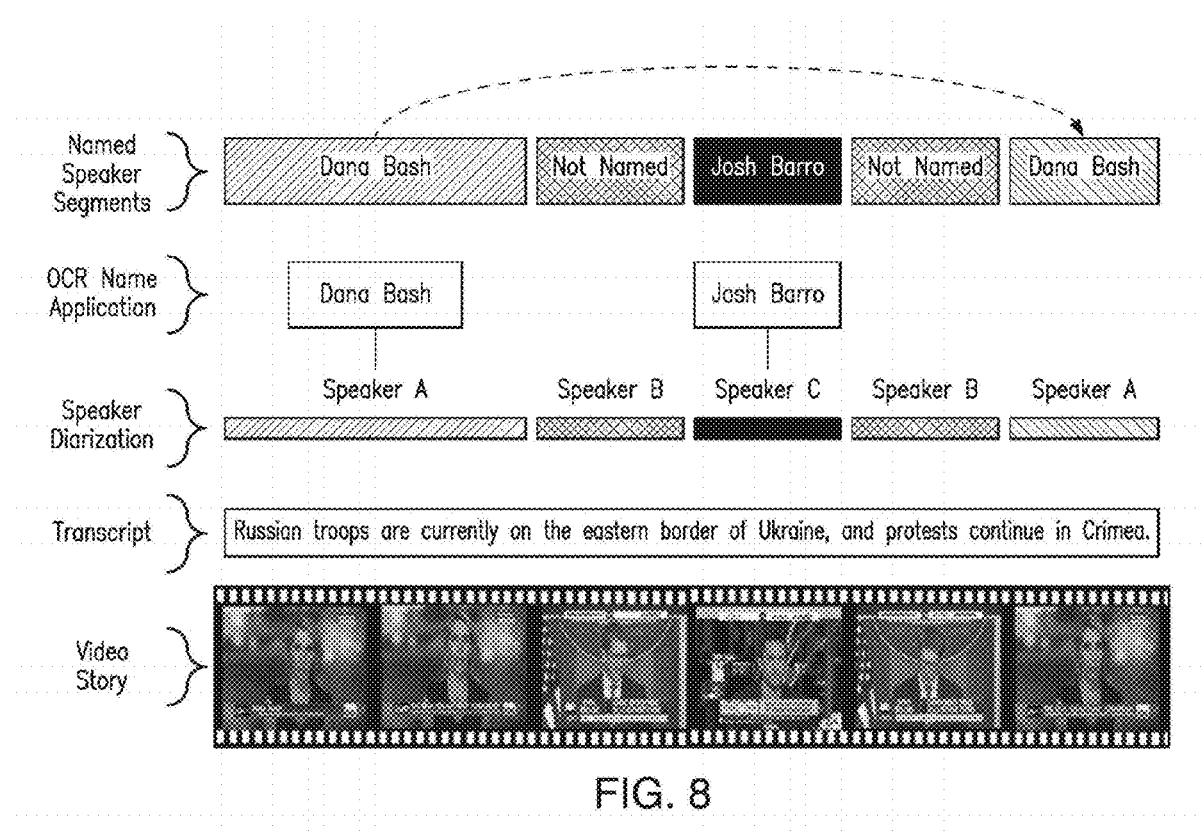
FIG. 8 is a diagram illustrating exemplary techniques for audio and OCR-based speaker naming, in accordance with some embodiments of the disclosed subject matter.

The audio and OCR based speaker naming algorithm does not attempt to name all of the faces that appear on screen, but can be configured to apply only names to faces which exceeding a certain confidence level. The system can begin by performing speaker diarization using the SHoUT toolkit, on the audio portion of each video story to determine when each speaker begins and ends speaking throughout the story. The system can then take the speech clusters and refine them to match the speaker changes that are denoted within the time-aligned closed caption transcript generated during the video processing stage. To name the speech portions the system can find when a person name appears on-screen, and apply that name as a label to that particular speech segment. For purpose of illustration, when a person is speaking, their name often will appear in a specific location on the screen (e.g., in the lower left corner). The system can first mine the specific "name location" for each separate program by performing OCR on the screen and then comparing the detected OCR text to a list of common first names from the Social Security Name database. Once the system identifies the "name location(s)" on the screen where names most frequently appear for each program, the system can use all of the detected text in this portion as a person name, and apply it as a label to the time-overlapping speech-segment. Once all of the names found are applied to the overlapping speech segments, the system can find any speaker clusters (the collections of similar speech segments created by speaker diarization) that have only one name applied to them and label these portions of the video according to that name. This technique is illustrated in FIGS. 7 and 8, for the purpose of illustration and not limitation. The system can extract from each video specific segments of a person speaking and label them with their name.

As an example, 198 videos from the dataset were sampled to see how many of the videos were named properly, and 170 out of 198 (85.85%) videos were properly named. The most common error cases occurred during free-flowing debates where it is difficult to detect a change of speaker.

Referring again to FIG. 1, the user interface 4 can be coupled to the extraction element 3. The user interface 4 can be configured to provide a user with at least one of the plurality of multimedia data segments associated with a corresponding one of the categories in the hierarchical category information. The user interface 4 can include a text entry box 16. In some embodiments the user interface 4 can include a cross-domain bookmarklet feature 17. In some embodiments the user interface 4 can include a filter feature 18. The user interface 4 can include a Serendipity feature, described in greater detail below. In some embodiments, the user interface 4 can be configured utilizing a physical simulation model 19 to provide the user with at least one of the multimedia data segments based on an interaction between two or more categories associated with the provided multimedia data segments. The categories can include a topic, a named speaker, or other information extracted from the multimedia data segment.

The user interface 4 can allow users to explore the space of linked, multi-source, multimodal news data. This can be accomplished in a number of ways. For purpose of illustration, an event and entity driven UI based on providing structured exploration for each of the discovered events, called semi-automatic, can be utilized. Additionally or alternatively, a physics-simulating bounce serendipity UI, called fully-automatic operation, can be utilized.

In some embodiments the user interface can include an interactive two-column matrix representing two distinct event types, termed as Long-Term Events and Breaking News Events. Essentially these two events differ in the granularity of news they cover. Breaking News Events can represent a more immediate chunk of information, and can include relatively more recent and typically a lower amount of multimedia coverage in the memory 2. The system can restrict the display to only videos and Major Players within each of these events. The Long-Term Events, which can represent a thematic cluster in the news, can generally include longer running and more diverse data, including videos, articles, major players and cluster categories.

Figure 9:
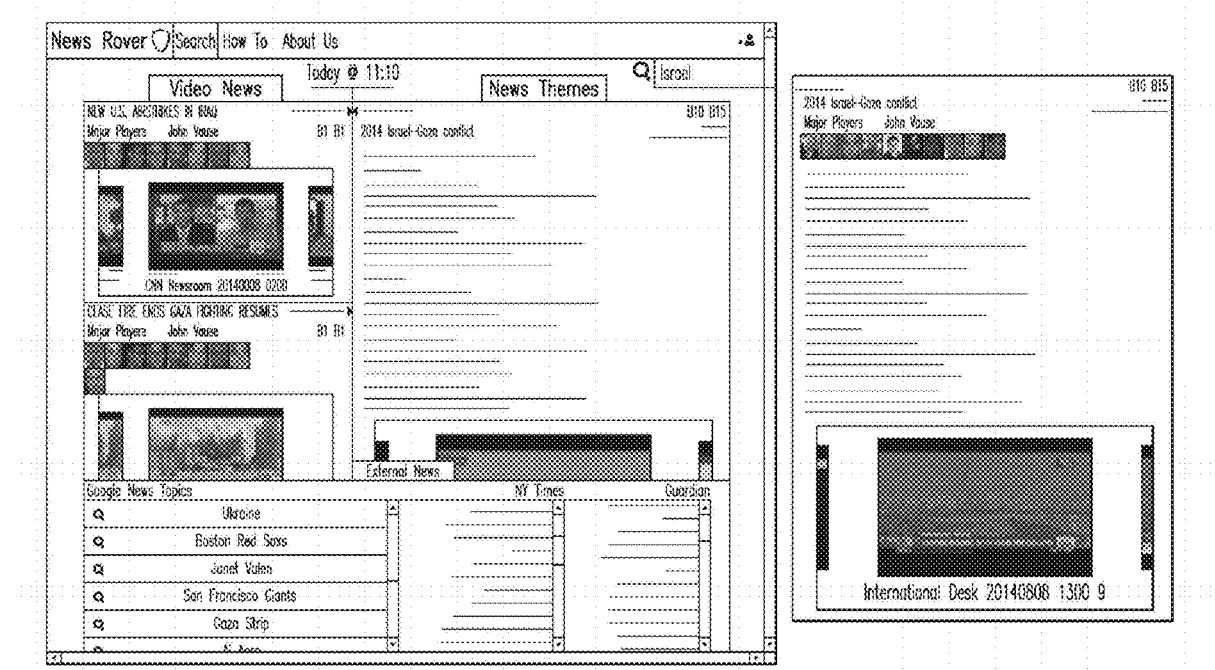
FIG. 9 illustrates an exemplary embodiment of a user interface, in accordance with some embodiments of the disclosed subject matter.

The user interface can include a dynamically reshuffling display that traverses the dimensional space to project subliminal topic linking to the column visualization. An image of an exemplary user interface is shown in FIG. 9, for purpose of illustration and not limitation.

Web technologies, which can be capable of leveraging both CPUs and GPUs in the browser, can use physical simulations to show data dynamics and inadvertently display difficult to predict outcomes. In some embodiments, the user interface can utilize non-deterministic modeling via a gravitational simulation and elastic collisions to model the importance of players in shaping news events and serendipitous interaction between players, concepts and events involved in a topic. This user interface can be called, generally, "Serendipity." The user interface can utilize physical simulations to reveal non-hard-coded dynamics within data. In this manner, as a person becomes more prominent in the news, the data set simulation can adapt and use gravity-based analysis to display the hidden multidimensional linking structure. The non-deterministic effect of the interaction between entities and subsequent display of video stories after entity collision leads to a novel serendipitous way of accessing potential news events of interest. Any suitable physical simulation can be used, including simulations applicable to a multi-body system. This interface can overcome the linearity of standard UI discovery and can add new visualization paradigms that can be appealing to consumers, for example by providing a passive lean-backward consumption approach. Further intuitive UIs can also be provided, for example where important objects appear from the data as a whole and become increasingly apparent based on their parameters.

The underlying principle of the physical simulation model 19 is the attribution of data parameters to certain physical properties. In an exemplary embodiment 'relevance' or 'importance' can represent mass. As such by simulating the dynamics of a multi body gravity simulation:

$$\sum \sum_{1}^{n} \frac{Gm_i m_1}{r^2},$$

the system can create a real-time adaptable system that represents the data. The system can be represented as a force simulator, and can endow other parameters with physical attributes. For example, the system can assign temporal distance to represent charge. In turn the simulation can be represented as:

$$\sum F_{gravity} + F_{electric} + F_{magnetic} = \sum \sum_{1}^{n} \frac{Gm_i m_1}{r^2} + q_i \overline{E} + q_i \overline{v}_i \overline{B}. \quad (1)$$

The constants can be empirically assigned by the user, or can be dynamically assigned as fields produced by data particles. Topological features in this space can be leveraged to create points where the simulation will tend to flow, e.g., places of low energy such as a gravity well.

Figure 10:
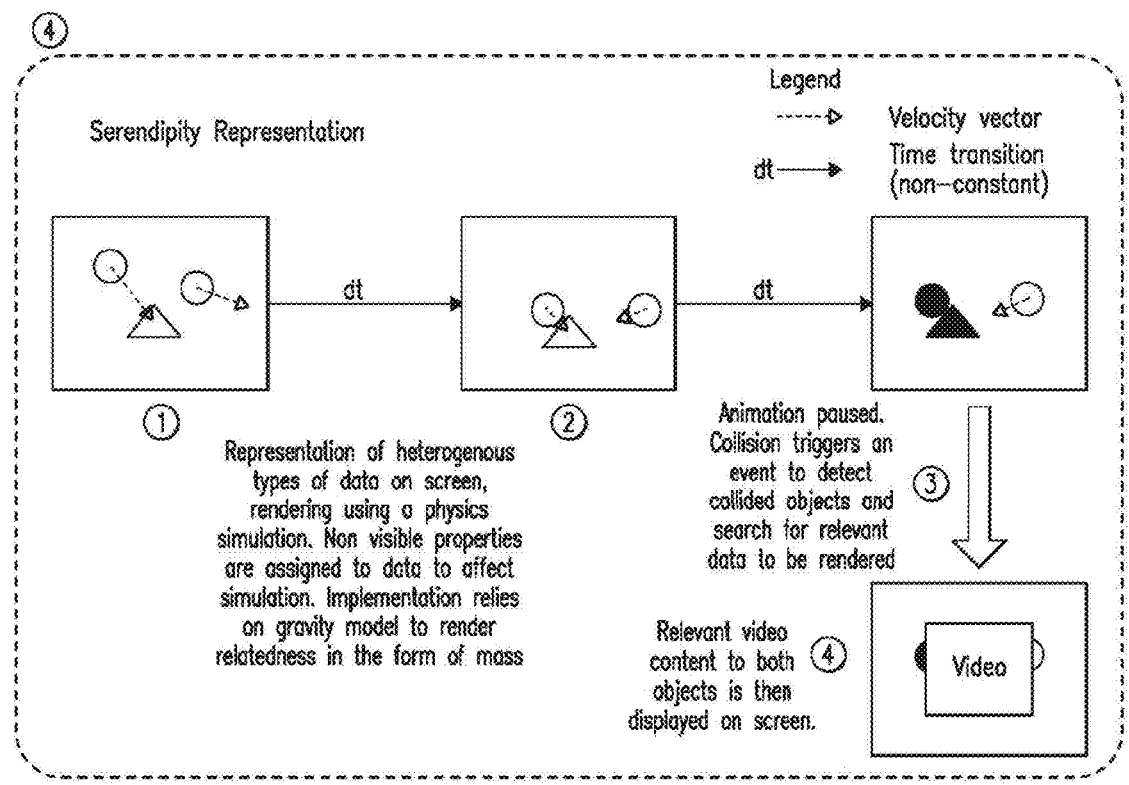
FIG. 10 is a diagram illustrating exemplary techniques for representing multimedia data, in accordance with some embodiments of the disclosed subject matter.
Figure 11:
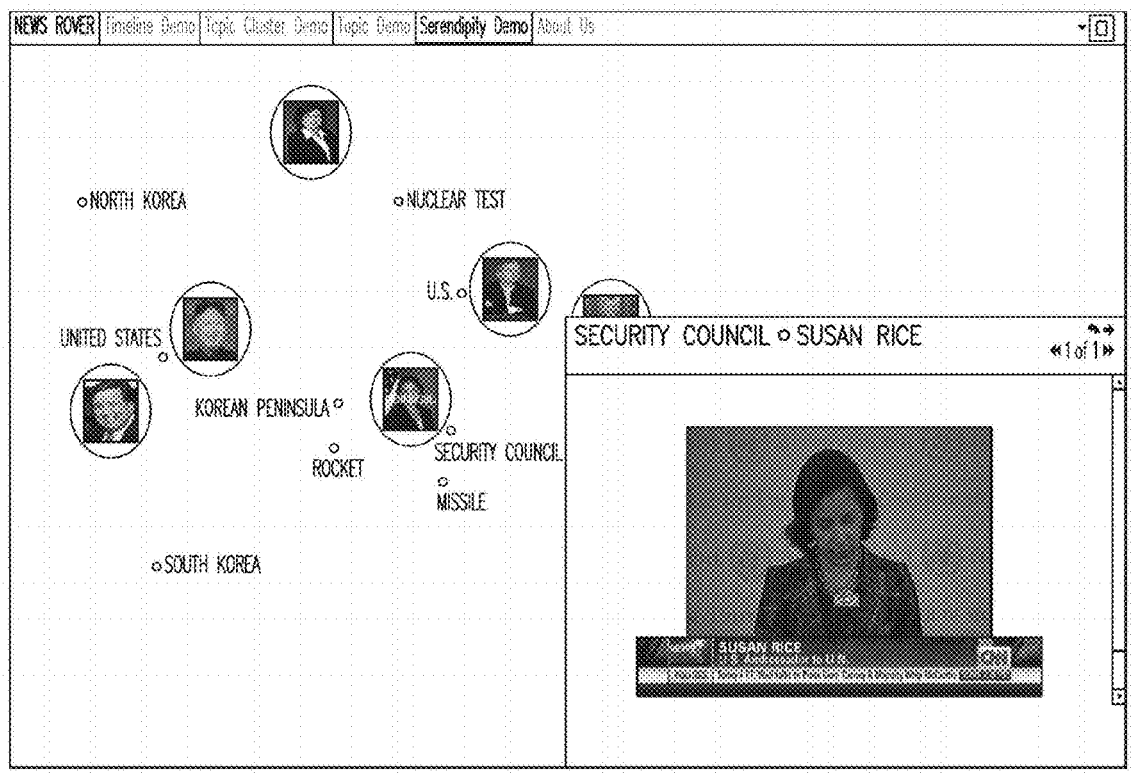
FIG. 11 illustrates another exemplary embodiment of a user interface, in accordance with some embodiments of the disclosed subject matter.

FIG. 10 shows, for the purpose of illustration and not limitation, the visual process used to generate the Serendipity event visualization. The visualization begins by taking two types of structured content extracted from the raw news streams and analyzed. For purpose of illustration and not limitation, the two types of content can be chosen as visual speakers in the news and extracted events. The visualization technique can place the visual speaker entities on screen in stationary positions, and certain events can be selected, for example events selected automatically by the system as the most popular events for the present time, and can move around the stationary visual speakers in accordance with the gravitational simulation. The gravitational simulation can allow the system to place dynamics on the system such that speakers who speak frequently on a particular event can be more attracted together than other speaker event pairings with fewer interactions. When a collision between a speaker and event appears on screen, the system can play a segment where that person is speaking from one of the videos linked to that particular event. This interaction therefore utilizes speaker naming and event linking algorithms to present the interactions between structured content. After the video segment is finished playing, the video can collapse and the gravitation simulation can resume with the events moving around the stationary speakers. This process can continue indefinitely, or until all of the speaker-event interactions have been shown. An image of the serendipity interface with visual speakers and events is shown in FIG. 11, for the purpose of illustration and not limitation.

The system can include various search entry points for users. For example, a search box input (text entry box 16), and a tag-and-search feature. The keyword based search box can include relevant filters. For example, a user can filter by sources of video (e.g., FOX, ABC, MSNBC, etc.), allowing a user to see various spins on the news. In some embodiments, the filters 18 can allows users to filter based on the country of origin of the source of video, or other features of the source video.

Figure 12:
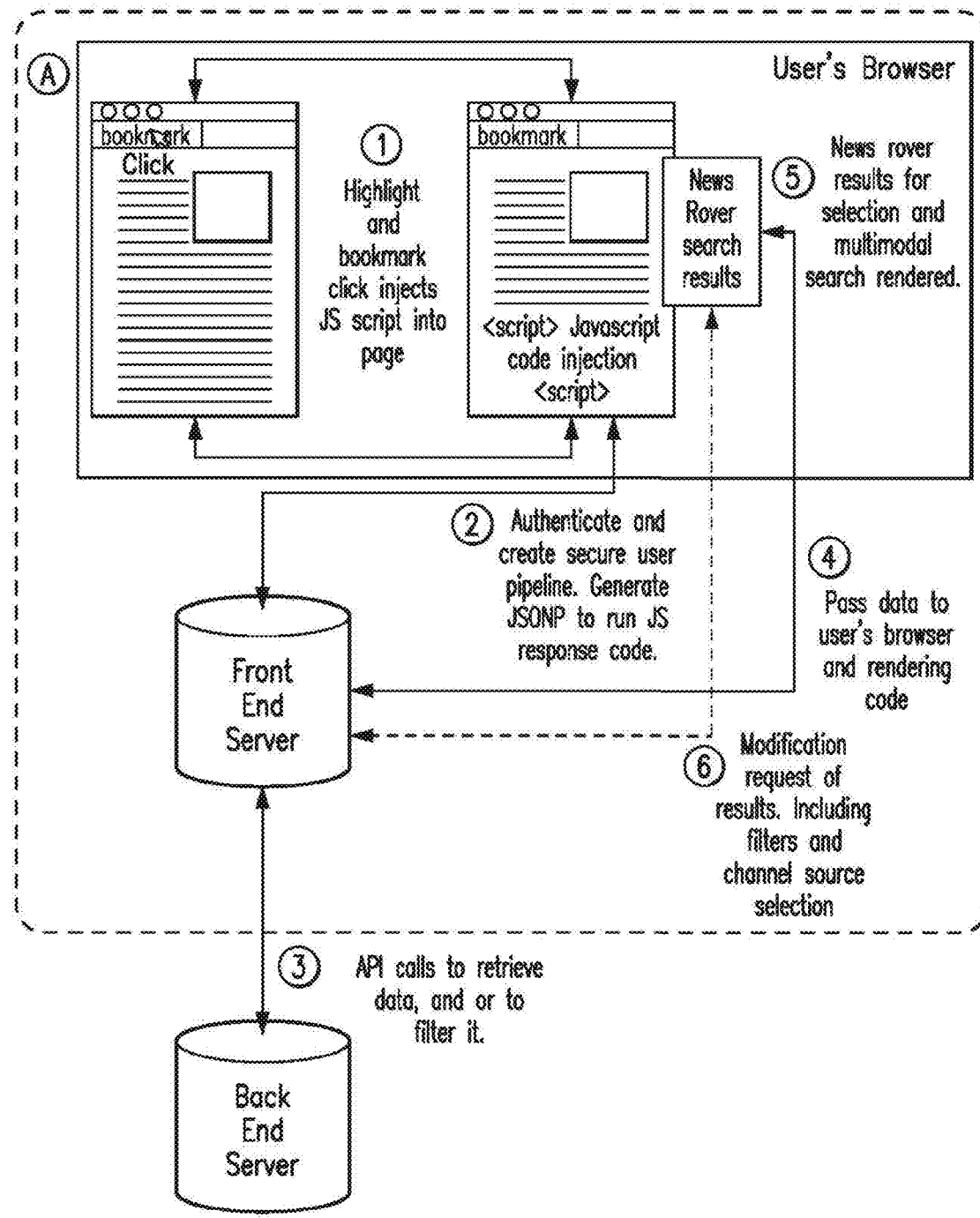
FIG. 12 is a diagram illustrating exemplary techniques for tagging and searching multimedia data, in accordance with some embodiments of the disclosed subject matter.
Figure 13:
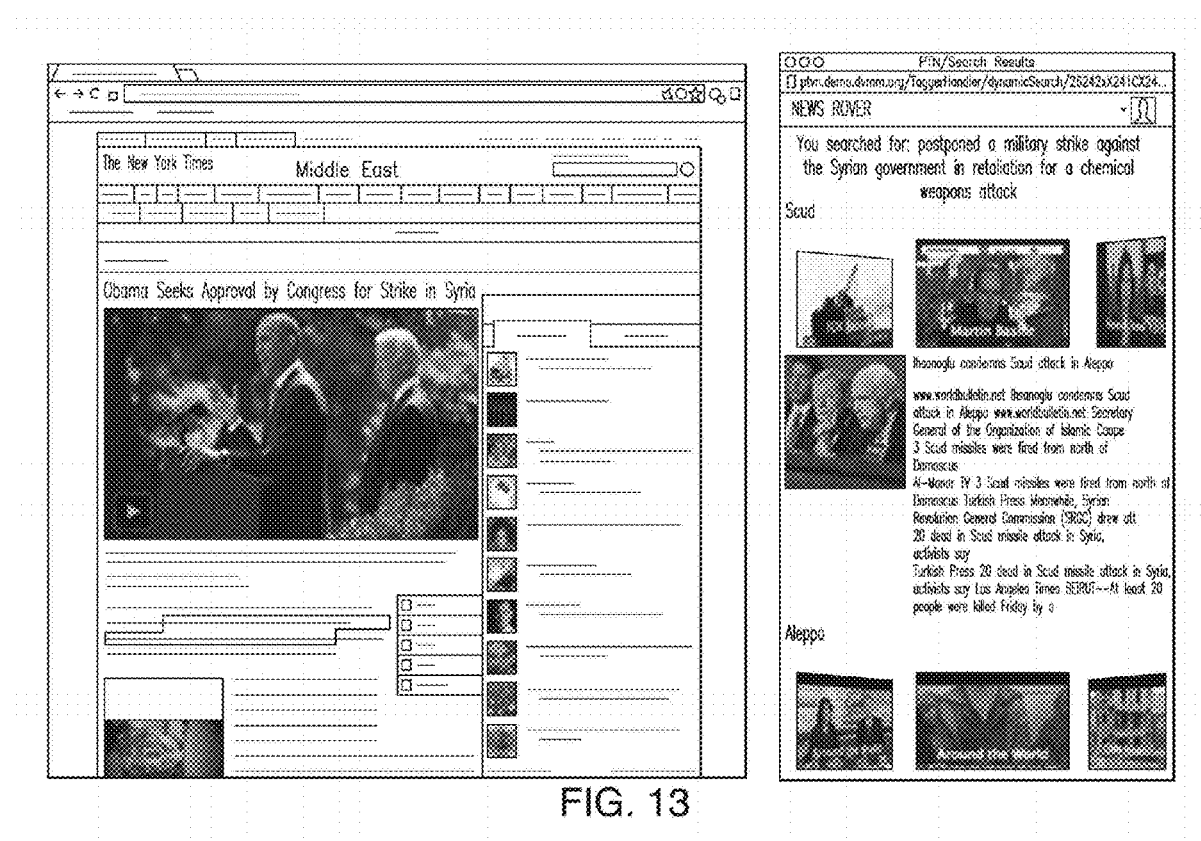
FIG. 13 illustrates additional details of tagging and searching multimedia data, in accordance with some embodiments of the disclosed subject matter.

A bookmarklet (a cross-domain bookmarklet feature 17) enables javascript (JS) injections into the current webpage allows cross-domain incorporation of the system in standard browsing habits. In this manner, the code can be loaded into the current page by executing a javascript snippet stored in the bookmark, which can introduce an HTML element that security permissions allow for cross-source generation (i.e., an image or a script). The code can be loaded into the page, and the system can make asynchronous calls to system servers. The system can form an encrypted pipeline, which can exchange security credentials, for example using the JSONP protocol, and can form an SSL pipeline, which can allow for the user to push and pull information to and from the system. This can enable the user to interact with the system, to enhance the content they were currently browsing or search/discover new content on the system. With single click functionality centered on a JS injection, a requirement for downloading a plugin for the web browser, for example due to built-in security restrictions in browsers, can be eliminated. However, every newly loaded page can be configured to require click activation in the bookmarklet to enable this interaction. The system can allow for on the fly page enhancement with the system archive. By extending the entity/event extraction and tracking capabilities, additional applications can be implemented. A detailed figure illustrating the implementation of the "tag-and-search" functionality is shown in FIG. 12, and an image demonstrating the capabilities is shown in FIG. 13, each for the purpose of illustration and not limitation.

Figure 14:
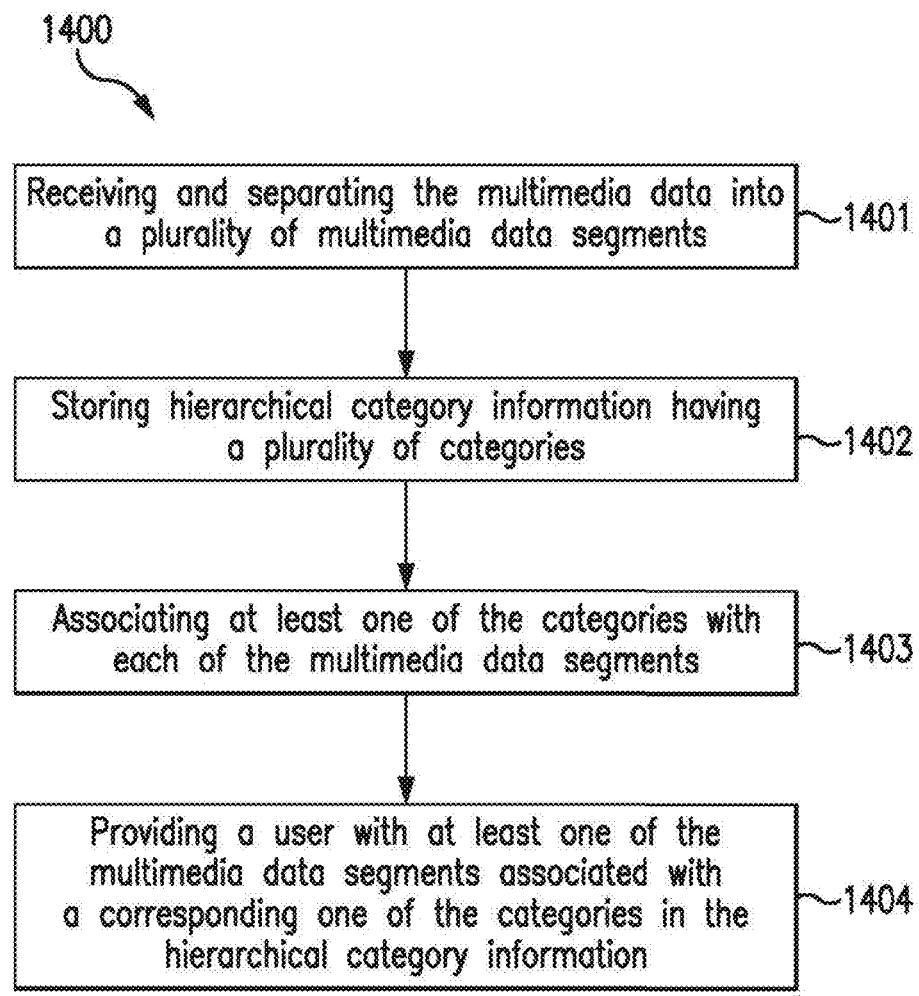
FIG. 14 is a diagram illustrating exemplary techniques for aggregation and organization of multimedia data acquired form a plurality of sources, in accordance with some embodiments of the disclosed subject matter.

FIG. 14 shows, for the purpose of illustration and not limitation, an exemplary method 1400 for aggregation and organization of multimedia data acquired from a plurality of sources. The method can include receiving and separating the multimedia data into a plurality of multimedia data segments (1401). The method can include storing hierarchical category information having a plurality of categories (1402). The method can include associating at least one of the categories with each of the multimedia data segments (1403). The method can include providing a user with at least one of the multimedia data segments associated with corresponding categories in the hierarchical category information (1404).

In some embodiments, receiving multimedia data (1401) can include recoding audiovisual data. Receiving multimedia data (1401) can include crawling web sites to acquire the multimedia data. Separating the multimedia data (1401) can include identifying multimedia data boundaries. In some embodiments identifying multimedia data boundaries can include reading closed captions. In some embodiments identifying multimedia data boundaries can include applying a dynamic time warping algorithm. In some embodiments separating the multimedia data (1401) can include identifying shot boundaries.

In some embodiments, associating the categories with each of the multimedia data segments (1403) can include visually matching at least a portion of the multimedia data and/or textually matching a least a portion of the multimedia data. In some embodiments, providing a user with at least one of the plurality of multimedia data segments (1404) can include a physical simulation.

Figure 15:
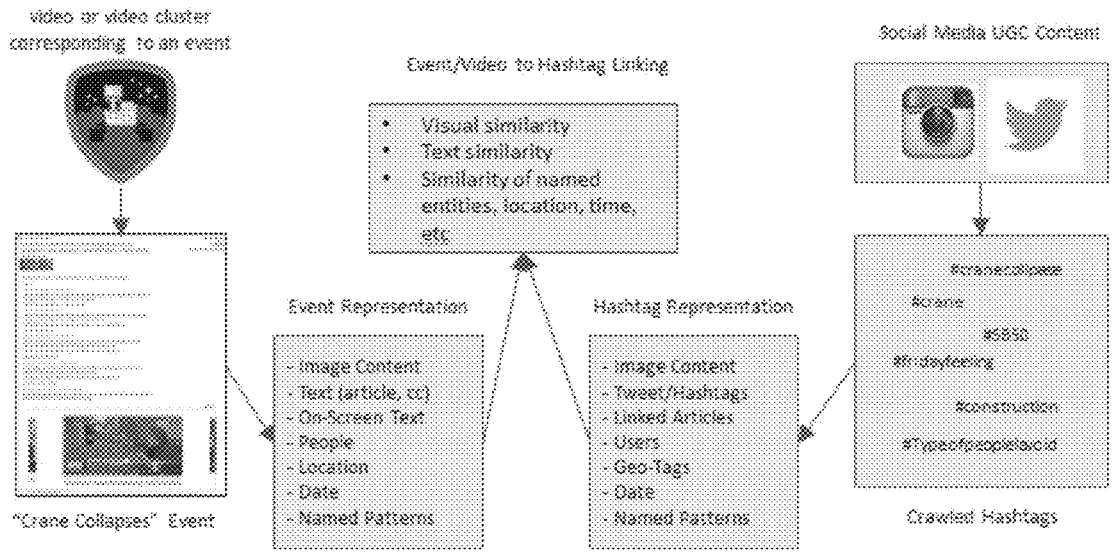
FIG. 15 is a diagram illustrating exemplary techniques for automatically linking a video story and/or a cluster of video stories to social media identifiers within social media without any manual or user defined inputs, in accordance with some embodiments of the disclosed subject matter.

In some embodiments, multimedia content can be automatically linked to relevant social media identifiers and/or social media trends (e.g., hashtags, Twitter handles, etc.). FIG. 15 shows, for the purpose of illustration and not limitation, an exemplary algorithm for automatically linking a video story and/or a cluster of video stories to hashtags within social media without any manual or user defined inputs. Although the exemplary embodiment shown in FIG. 15 is described in the context of hashtags, the disclosed techniques can be used with any combination of other social media identifiers.

In some embodiments, according to the exemplary algorithm shown in FIG. 15, representations can be generated for social media trends (e.g., hashtags) and events captured in videos. According to the exemplary algorithm of FIG. 15, certain similarities of these representations can be used to link social media hashtags to videos by using the raw social media stream from a particular social media site (e.g., Facebook, Twitter, Instagram, Vine, Snapchat, etc.) and by constructing a representation of that hashtag.

According to the exemplary algorithm shown in FIG. 15, a "hashtag representation" can be constructed by aggregating all of the content that has been tagged with an associated hashtag. The aggregated content can include information such as the text associated with the social posts, images, sound and speech, users, time, and other forms of metadata. Once this data is collected, a representation can be formed in each of these modalities (e.g., text associated with the social posts, images, sound and speech, users, time, and other forms of metadata) for each particular hashtag. The representations that are formed can be sufficiently diverse to provide coverage of a majority of the aspects and content covered by the hashtag, but also can be specific enough to define the hashtag in a way that is differentiated from other existing hashtags. According to the exemplary algorithm depicted in FIG. 15, a similarity metric with respect to a video can be generated, such that the similarity metric includes the information contained in the visual frames, the transcript information, the sound track, the time the video was aired, and other information available about the video. A similarity based algorithm can be used to define the "closeness" (e.g., a similarity metric) between a video and hashtag. A similarity based algorithm can be an algorithm that compares attributes of the multimedia content (e.g., text, sound, and images associated with the multimedia content, users, time, and other forms of metadata) against a hashtag to generate a similarity metric. The similarity based algorithm can use such a similarity metric to actively link hashtags to each video when the similarity metric exceeds a predefined threshold. The similarity metric can be used to combine similarities in terms of text modality, audio-visual modality (e.g., images and videos), and other modalities such as time and location.

Figure 16:
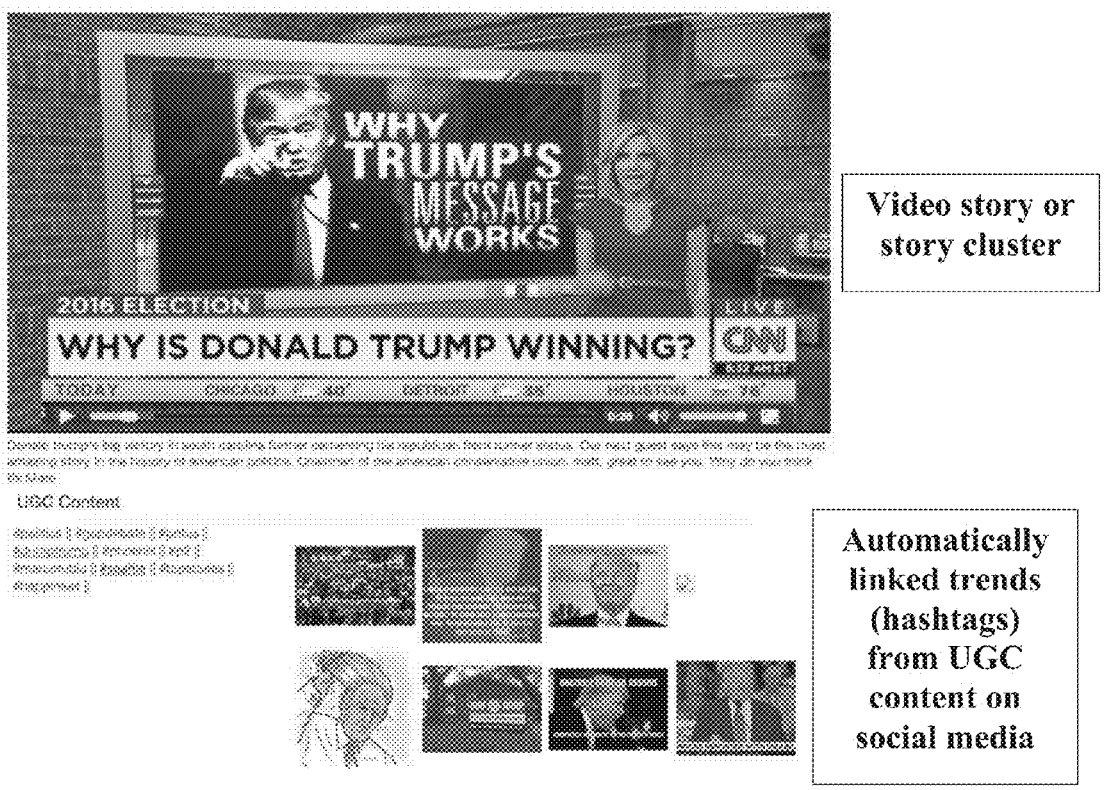
FIG. 16 is a diagram illustrating an exemplary video segment related to an event and the related social media trends that are automatically linked to the video segment, in accordance with some embodiments of the disclosed subject matter.

FIG. 16 is a diagram illustrating an exemplary video segment related to an event and the related social media trends that are automatically linked to the video segment. In some embodiments, in order to leverage the associations/links generated between videos and hashtags, an editor suite can be used. The editor suite can allow a news editor or video producer to automatically leverage the content of related hashtags to a video. An editing suite, that facilitates searching over a video corpus can be used to recommend video content that is related to text or multimedia content. As shown in FIG. 16, for each video in the video corpus, the most relevant hashtags can be presented based on the linking algorithm described above with relation to FIG. 15, and corresponding content that is associated with the identified relevant hashtags. Examples of the displayed content from a hashtag can be images, videos, user information, social media posts, and a timeline of information about the content. An editor or producer of a video can augment his/her stories and/or social media posts by directly adding matched videos or related user generated content from social media sites into their stories and/or social media posts.

While the disclosed subject matter is described herein in terms of certain exemplary embodiments, those skilled in the art will recognize that various modifications and improvements can be made to the disclosed subject matter without departing from the scope thereof. Moreover, although individual features of one embodiment of the disclosed subject matter can be discussed herein, or shown in the drawing of one of the embodiments and not in another embodiment, it should be apparent that individual features of one embodiment can be combined with one or more features of another embodiment or features from a plurality of embodiments. Thus, the foregoing description of specific embodiments of the disclosed subject matter has been presented for purposes of illustration and description. It is not intended to be exhaustive or to limit the disclosed subject matter to those embodiments disclosed.

The invention claimed is:

1. A system, comprising:
a data collection element configured to receive multimedia data, the multimedia data comprising visual data;
a multimedia segmentation element coupled to the data collection element, the multimedia segmentation element configured to separate the multimedia data into a plurality of multimedia data segments;
a memory configured to store hierarchical category information having a plurality of categories;
an extraction element coupled to the multimedia segmentation element and the memory, the extraction element configured to at least:
generate, based at least on the visual data, a face track for a plurality of persons appearing in the visual data;
identify, based at least on differences between two or more video frames in the face track, at least one speaker in the plurality of persons appearing in the visual data; and
associate, based at least on an identity of the at least one speaker, a category with at least one of the plurality of multimedia data segments; and
a user interface, coupled to the extraction element, configured to provide a user with at least one of the multimedia data segments associated with a corresponding one of the categories in the hierarchical category information.

2. The system of claim 1, wherein the data collection element further comprises a recorder configured to record audiovisual data.

3. The system of claim 2, wherein the recorder is configured to record at least one of analog video content and digital video content.

4. The system of claim 2, wherein the recorder further comprises a scheduling routine configured to query an electronic program guide feed and schedule a recording job for a news program.

5. The system of claim 1, wherein the data collection element further comprises a web crawler.

6. The system of claim 1, wherein the multimedia segmentation element further comprises a closed caption reader configured to identify multimedia data boundaries based on closed caption data.

7. The system of claim 6, wherein the multimedia segmentation element further comprises a dynamic time warping algorithm configured to align audiovisual data and closed caption data.

8. The system of claim 1, wherein the multimedia segmentation element further comprises a speech recognition element.

9. The system of claim 1, wherein the multimedia segmentation element further comprises a shot detection element configured to identify shot boundaries.

10. The system of claim 1, wherein at least one of the plurality of categories comprises a long-term news event.

11. The system of claim 1, wherein at least one of the plurality of categories comprises a breaking news event.

12. The system of claim 1, wherein the extraction element further comprises a news video frame layout identifier.

13. The system of claim 1, wherein the extraction element further comprises a visual matching element.

14. The system of claim 1, wherein the extraction element further comprises a text-matching element.

15. The system of claim 14, wherein the text-matching algorithm further comprises a term-frequency and inverse-document-frequency (TF-IDF) algorithm.

16. The system of claim 1, wherein the extraction element further comprises a video character recognition element configured to recognize text superimposed on video frames.

17. The system of claim 1, wherein the user interface further comprises a text entry box.

18. The system of claim 1, wherein the user interface further comprises a cross-domain bookmarklet feature.

19. The system of claim 1, wherein the user interface further comprises a filter feature.

20. The system of claim 1, wherein the user interface is further configured utilizing a physical simulation model to provide the user with at least one of the multimedia data segments based on an interaction between two or more categories associated with the provided multimedia data segments.

21. The system of claim 20, wherein the categories can include a topic, a named speaker, or other information extracted from the multimedia data segment.

22. The system of claim 1, wherein the extraction element is further configured to link, based on the category, the at least one of the plurality of multimedia data segments to a social media identifier.

23. The system of claim 22, wherein the social media identifier comprises a hashtag.

24. The system of claim 1, wherein the extraction element is further configured to at least:
identify, based at least on the differences between two or more frames in the face track, a portion of the visual data during which the at least one speaker is speaking; and
determine the identity of the at least one speaker based at least on a portion of closed caption data that temporally overlaps with the portion of the visual data during which the at least one speaker is speaking.

25. The system of claim 1, wherein the extraction element is further configured to at least:

identify, based at least on the differences between two or more frames in the face track, a portion of the visual data during which the at least one speaker is speaking; and determine the identity of the at least one speaker based at least on text superimposed on one or more video frames that comprise the portion of the visual data during which the at least one speaker is speaking.

26. The system of claim 25, wherein the extraction element is further configured to at least:

identify at least one text region in the one or more video frames; and extract, from the at least one text region, the text superimposed on the one or more video frames, the text being extracted by at least applying optical character recognition (OCR) to the at least text region.

27. The system of claim 26, wherein the at least one text region is identified based on one or more frame layouts of the visual data, the one or more frame layout being associated with a broadcast channel and/or a broadcast program.

28. A method, comprising:

receiving multimedia data comprising visual data;

separating the multimedia data into a plurality of multimedia data segments;

storing hierarchical category information having a plurality of categories;

generating, based at least on the visual data, a face track for a plurality of persons appearing in the visual data;

identifying, based at last on differences between two or more video frames in the face track, at least one speaker in the plurality of persons appearing in the visual data;

associating, based at least on an identity of the at least one speaker, a category with at least one of the plurality of multimedia data segments; and providing a user with at least one of the multimedia data segments associated with corresponding categories in the hierarchical category information.

29. The method of claim 28, wherein receiving multimedia data further comprises recording audiovisual data.

30. The method of claim 28, wherein receiving multimedia data further comprises crawling web sites to acquire the multimedia data.

31. The method of claim 28, wherein segmenting the multimedia data further comprises identifying multimedia data boundaries.

32. The method of claim 31, wherein the multimedia data boundaries are identified based at least on closed caption data.

33. The method of claim 31, wherein identifying multimedia data boundaries further comprises applying a dynamic time warping algorithm.

34. The method of claim 28, wherein segmenting the multimedia data further comprises identifying shot boundaries.

35. The method of claim 28, wherein associating at least one of the categories with each of the multimedia data segments further comprises visually matching at least a portion of the multimedia data and/or textually matching a least a portion of the multimedia data.

36. The method of claim 28, further compromising linking, based on the category, the at least one of the plurality of multimedia data segments to a social media identifier.

* * * * *